US007912427B2

(12) United States Patent
Santoru et al.

(10) Patent No.: US 7,912,427 B2

(45) Date of Patent: Mar. 22, 2011

(54) SINGLE-WIRE MULTISWITCH AND CHANNELIZED RF CABLE TEST METER

(75) Inventors: Joseph Santoru, Agoura Hills, CA (US); David J. Kuether, Brea, CA (US); Benjamin Mui, Redondo Beach, CA (US); Shamik Maitra, Redondo Beach, CA (US); Dipak M. Shah, Westminster, CA (US); Romulo Pontual, Larchmont, NY (US); James R. Butterworth, Rancho Palos Verdes, CA (US); Philip J. Goswitz, Rancho Palos Verdes, CA (US); Ernest C. Chen, San Pedro, CA (US); Gustave R. Stroes, Beverly Hills, CA (US); Bradley T. Ito, Rowland Heights, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 608 days.

(21) Appl. No.: 12/032,807

(22) Filed: Feb. 18, 2008

(65) Prior Publication Data

US 2008/0209478 A1 Aug. 28, 2008

Related U.S. Application Data

(60) Provisional application No. 60/901,828, filed on Feb. 19, 2007, provisional application No. 60/902,233, filed on Feb. 20, 2007, provisional application No. 60/902,437, filed on Feb. 22, 2007.

(51) Int. Cl.
*H04B 17/00* (2006.01)

(52) U.S. Cl. ....... 455/67.11; 455/9; 455/67.7; 455/3.06; 455/3.02; 725/68; 343/757

(58) Field of Classification Search ................. 455/3.02, 455/3.03, 3.06, 9, 67.11, 67.12, 67.16, 67.7, 455/556.1, 134, 140, 150.1, 154.1; 725/64, 725/68; 343/757; 342/450, 357.06, 352, 342/353; 370/316, 112, 73, 108, 70
See application file for complete search history.

(56) References Cited

U.S. PATENT DOCUMENTS

| | | | | |
|---|---|---|---|---|
| 4,707,699 | A * | 11/1987 | Toellner et al. | 342/352 |
| 5,610,916 | A * | 3/1997 | Kostreski et al. | 370/487 |
| 5,646,942 | A * | 7/1997 | Oliver et al. | 370/312 |
| 5,945,945 | A * | 8/1999 | Wagner et al. | 342/359 |
| 6,157,812 | A * | 12/2000 | Sarraf | 455/13.4 |
| 2003/0040852 | A1* | 2/2003 | Green et al. | 701/13 |
| 2006/0095206 | A1* | 5/2006 | Garin et al. | 701/213 |
| 2008/0165069 | A1* | 7/2008 | Stroes et al. | 343/757 |
| 2008/0165070 | A1* | 7/2008 | Stroes et al. | 343/757 |
| 2008/0169980 | A1* | 7/2008 | Underbrink et al. | 342/450 |

* cited by examiner

*Primary Examiner* — Tan Trinh

(57) ABSTRACT

Multiple embodiments of systems for testing the delivery of satellite and cable television signals are described.

17 Claims, 11 Drawing Sheets

SINGLE-WIRE MULTISWITCH AND CHANNELIZED RF CABLE TEST METER

CROSS-REFERENCE TO RELATED APPLICATIONS

This application claims the benefit under 35 U.S.C Section 119(e) of U.S. Provisional Application Ser. No. 60/901,828, filed on Feb. 19, 2007, by Joseph Santoru et al., entitled "SINGLE WIRE MULTISWITCH METER," U.S. Provisional Application Ser. No. 60/902,233, filed on Feb. 20, 2007, by Joseph Santoru et al., entitled "SINGLE WIRE MULTISWITCH METER," and also claims the benefit under 35 U.S.C Section 119(e) of U.S. Provisional Application Ser. No. 60/902,437, filed on Feb. 21, 2007, by Joseph Santoru et al., entitled "CHANNELIZED RF CABLE TEST METER," which applications are incorporated by reference herein.

BACKGROUND OF THE INVENTION

1. Field of the Invention.

The present invention relates generally to testing a satellite receiver system, and in particular, to a single-wire multiswitch meter used to test such a system.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to television 114 for viewing by a user. There can be more than one satellite transmitting from each orbital location.

Satellite uplink signals 116 are transmitted by one or more uplink facilities 118 to the satellites 102-104 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz. Future satellites will likely broadcast in the Ka-band of frequencies, i.e., 18-40 GHz, but typically 20-30 GHz. Alternatively, cable 122 can deliver signals to receiver 114.

FIG. 2 illustrates a typical ODU of the related art.

ODU 108 typically uses reflector dish 122 and feedhorn assembly 124 to receive and direct downlink signals 120 onto feedhorn assembly 124. Reflector dish 122 and feedhorn assembly 124 are typically mounted on bracket 126 and attached to a structure for stable mounting. Feedhorn assembly 124 typically comprises one or more Low Noise Block converters 128, which are connected via wires or coaxial cables to a multiswitch, which can be located within feedhorn assembly 124, elsewhere on the ODU 108, or within house 110. LNBs typically downconvert the FSS-band, Ku-band, and Ka-band downlink signals 120 into frequencies that are easily transmitted by wire or cable, which are typically in the L-band of frequencies, which typically ranges from 950 MHz to 2150 MHz. This downconversion makes it possible to distribute the signals within a home using standard coaxial cables.

The multiswitch enables system 100 to selectively switch the signals from SatA 102, SatB 104, and SatC 106, and deliver these signals via cables 124 to each of the IRDs 112A-D located within house 110. Typically, the multiswitch is a five-input, four-output (5×4) multiswitch, where two inputs to the multiswitch are from SatA 102, one input to the multiswitch is from SatB 104, and one input to the multiswitch is a combined input from SatB 104 and SatC 106. There can be other inputs for other purposes, e.g., off-air or other antenna inputs, without departing from the scope of the present invention. The multiswitch can be other sizes, such as a 6×8 multiswitch, if desired. SatB 104 typically delivers local programming to specified geographic areas, but can also deliver other programming as desired.

To maximize the available bandwidth in the Ku-band of downlink signals 120, each broadcast frequency is further divided into polarizations. By aligning polarizations between the downlink polarization and the LNB 128 polarization, downlink signals 120 can be selectively filtered out from travelling through the system 100 to each IRD 112A-D.

IRDs 112A-D currently use a one-way communications system to control the multiswitch. Each IRD 112A-D has a dedicated cable 124 connected directly to the multiswitch, and each IRD independently places a voltage and signal combination on the dedicated cable to program the multiswitch. For example, IRD 112A may wish to view a signal that is provided by SatA 102. To receive that signal, IRD 112A sends a voltage/tone signal on the dedicated cable back to the multiswitch, and the multiswitch delivers the SatA 102 signal to IRD 112A on dedicated cable 124. IRD 112B independently controls the output port that IRD 112B is coupled to, and thus may deliver a different voltage/tone signal to the multiswitch. The voltage/tone signal typically comprises a 13 Volts DC (VDC) or 18 VDC signal, with or without a 22 kHz tone superimposed on the DC signal. 13 VDC without the 22 kHz tone would select one port, 13 VDC with the 22 kHz tone would select another port of the multiswitch, etc. There can also be a modulated tone, typically a 22 kHz tone, where the modulation schema can select one of any number of inputs based on the modulation scheme.

To reduce the cost of the ODU 108, outputs of the LNBs 128 present in the ODU 108 can be combined, or "stacked," depending on the ODU 108 design. The stacking of the LNB 128 outputs occurs after the LNB has received and downconverted the input signal. This allows for multiple polarizations, two from each satellite 102-106, to pass through each LNB 128. So one LNB 128 can, for example, receive both the Left Hand Circular Polarization (LHCP) and Right Hand Circular Polarized (RHCP) signals from SatC 102, while another LNB receives the Left Hand Circular Polarization (LHCP) and the Right Hand Circular Polarization (RHCP) signals from SatB 104, which allows for fewer wires or cables between the LNBs 128 and the multiswitch.

The Ka-band of downlink signals 120 will be further divided into two bands, an upper band of frequencies called the "A" band and a lower band of frequencies called the "B" band. Once satellites are deployed within system 100 to broadcast these frequencies, each LNB 128 can deliver the signals from the Ku-band, the A band Ka-band, and the B band Ka-band signals for a given polarization to the multiswitch. However, current IRD 112 and system 100 designs cannot tune across this entire frequency band, which limits the usefulness of this stacking feature.

By stacking the LNB 128 inputs as described above, each LNB 128 typically delivers 48 transponders of information to the multiswitch, but some LNBs 128 can deliver more or less in blocks of various size. The multiswitch allows each output of the multiswitch to receive every LNB 128 signal (which is an input to the multiswitch) without filtering or modifying that information, which allows for each IRD 112 to receive more data. However, as mentioned above, current IRDs 112 cannot use the information in some of the proposed frequencies used for downlink signals 120, thus rendering useless the information transmitted in those downlink signals 120. The IRD 112/308 cannot receive signals in the 250-750 MHz band, so there needs to be a frequency translation for the B-band signals.

In addition, all inputs to the multiswitch are utilized by the current satellite 102-106 configuration, which prevents upgrades to the system 100 for additional satellite downlink signals 120 to be processed by the IRD 112. Further, adding another IRD 112 to a house 110 requires a cabling run back to the ODU 108. Such limitations on the related art make it difficult and expensive to add new features, such as additional channels, high-definition programming, additional satellite delivery systems, etc., or to add new IRD 112 units to a given house 110.

Even if additional multiswitches are added, the related art does not take into account cabling that may already be present within house 110, or the cost of installation of such multiswitches given the number of ODU 108 and IRD 112 units that have already been installed. Although many houses 110 have coaxial cable routed through the walls, or in attics and crawl spaces, for delivery of audio and video signals to various rooms of house 110, such cabling is often not used by system 100 in the current installation process.

It can be seen, then, that there is a need in the art for a satellite broadcast system that can be expanded. It can also be seen that there is a need in the art for a satellite broadcast system that utilizes pre-existing household cabling to minimize cost and increase flexibility in arrangement of the system components. It can also be seen that there is a need in the art to test the system described to make sure that the system is operational. It can also be seen that there is a need in the art to test new cable installations.

SUMMARY OF THE INVENTION

To minimize the limitations in the prior art, and to minimize other limitations that will become apparent upon reading and understanding the present specification, the present invention describes systems, methods, and apparatuses for testing the delivery of satellite signals.

A system in accordance with the present invention comprises a meter, coupled to a receive antenna through a Single-Wire Multiswitch (SWM), wherein the receive antenna receives satellite signals and downconverts the satellite signals to an intermediate frequency spectrum; and the SWM selects the requested frequencies for the IRDs the meter comprising: a plurality of filters, at least one detector, coupled to the plurality of filters, for detecting a portion of the intermediate frequency spectrum, the portion of the intermediate frequency spectrum being defined by the plurality of filters, a comparator, for comparing the detected portion of the intermediate frequency against a predetermined condition, and at least one indicator, coupled to the at least one detector, for indicating an actual condition of the portion of the intermediate frequency spectrum.

Such a system further optionally comprises the actual condition of the portion of the intermediate frequency spectrum comprising a power level of the portion of the intermediate frequency spectrum, a switch network, coupled to the plurality of filters, such that the intermediate frequency spectrum being filtered through the plurality of filters in a sequential manner, the at least one indicator being a light emitting diode, the light emitting diode emitting light in a first color when the comparator determines that the predetermined condition is met by the actual condition of the portion of the intermediate frequency spectrum, actual conditions of a plurality of portions of the intermediate frequency spectrum being indicated simultaneously, a Frequency Shift Keyed (FSK) detector, coupled to the plurality of filters, for detecting a condition of an FSK communications channel, a tone generator, coupled to an input of the plurality of filters, the at least one indicator being a power meter, and the predetermined condition being stored in the meter.

Another system in accordance with the present invention comprises a meter, coupled to a cable for delivering signals, comprising: a mixer for receiving the satellite signals, a frequency source, coupled to the mixer, for converting the signals to an intermediate frequency spectrum, a filter, coupled to an output of the mixer;

at least one detector, coupled to the filter, for detecting a portion of the intermediate frequency spectrum, the portion of the intermediate frequency spectrum being defined by the filter, at least one indicator, coupled to the at least one detector, for indicating an actual condition of the portion of the intermediate frequency spectrum, and a controller, coupled to the frequency source, for changing the frequency source wherein changing the frequency source changes the intermediate frequency spectrum such that different portions of the intermediate frequency spectrum are detected by the detector.

Such a system further optionally comprises the actual condition of the portion of the intermediate frequency spectrum comprises a power level of the portion of the intermediate frequency spectrum, the at least one indicator being a light emitting diode, the light emitting diode emitting light in a first color when the comparator determines that the predetermined condition is met by the actual condition of the portion of the intermediate frequency spectrum, actual conditions of a plurality of portions of the intermediate frequency spectrum being indicated simultaneously, a Frequency Shift Keyed (FSK) detector, coupled to the plurality of filters, for detecting a condition of an FSK communications channel, and the at least one indicator being a power meter.

Other features and advantages are inherent in the system and method claimed and disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF PREFERRED EMBODIMENTS

Figure 1:
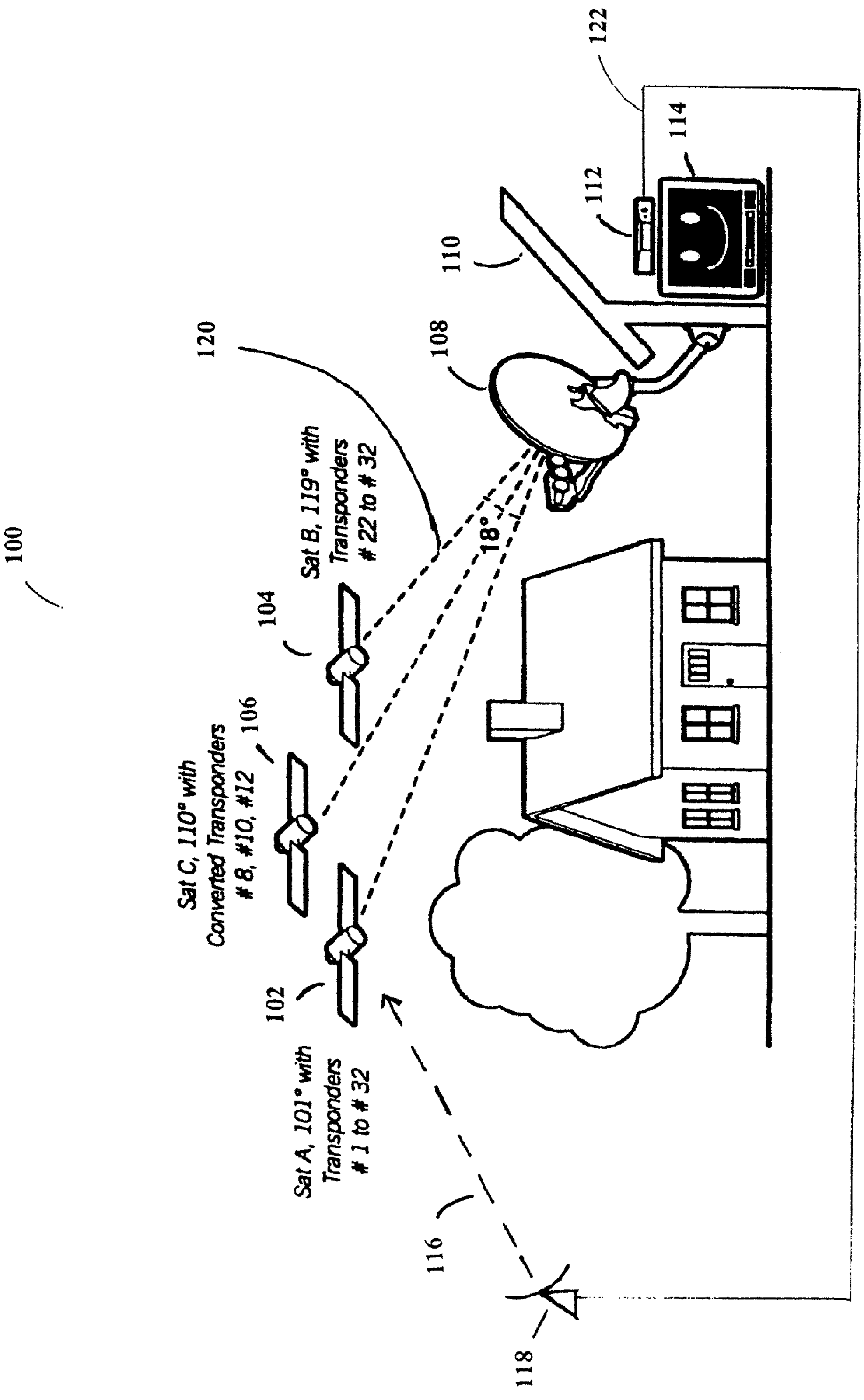
FIG. 1 illustrates a typical satellite television installation of the related art.

In the following description, reference is made to the accompanying drawings which form a part hereof, and which show, by way of illustration, several embodiments of the present invention. It is understood that other embodiments may be utilized and structural changes may be made without departing from the scope of the present invention.

Overview

Currently, there are three orbital slots, each comprising one or more satellites, delivering direct-broadcast television programming signals. However, ground systems that currently receive these signals cannot accommodate additional satellite signals, and cannot process the additional signals that will be used to transmit high-definition television (HDTV) signals. The HDTV signals can be broadcast from the existing satellite constellation, or broadcast from the additional satellite(s) that will be placed in geosynchronous orbit. The orbital locations of the satellites are fixed by regulation as being separated by nine degrees, so, for example, there is a satellite at 101 degrees West Longitude (WL), SatA 102; another satellite at 110 degrees WL, SatC 106; and another satellite at 119 degrees WL, SatB 104. Other satellites may be at other orbital slots, e.g., 72.5 degrees, 95, degrees, 99 degrees, and 103 degrees, and other orbital slots, without departing from the scope of the present invention. The satellites are typically referred to by their orbital location, e.g., SatA 102, the satellite at 101 WL, is typically referred to as "101." Additional orbital slots, with one or more satellites per slot, are presently contemplated.

The present invention allows currently installed systems to continue receiving currently broadcast satellite signals, as well as allowing for expansion of additional signal reception and usage. Further, the present invention allows for the use of pre-existing cabling within a given home such that the signal distribution within a home can be done without large new cable runs from the external antenna to individual set-top boxes.

Further, the present invention is useable with many terrestrial cable and satellite television delivery systems, where, again, the overriding issues related to individual home installations are cost and difficulty of installation. Many homeowners cannot self-install the equipment because they cannot determine whether or not pre-existing wiring can be used, and the specifications required by the receivers and other equipment are too difficult to understand. Further, professional installers are not always equipped to determine thresholds, understand different receiver requirements, etc.

The present invention allows currently installed systems to continue receiving currently transmitted signals, as well as allowing for expansion of additional signal reception and usage. Further, the present invention allows for the use of pre-existing cabling within a given home such that the signal distribution within a home can be done without large new cable runs from the external signal source to individual set-top boxes, whether they are used with a terrestrial cable system or with a satellite delivery system.

Terrestrial cable and satellite systems use "channels" to deliver the signals that are decoded by the receiver prior to showing the program on monitor 114. These channels have a typical bandwidth, e.g., 6 MHz for terrestrial cable delivery, and 30 MHz for satellite signal delivery. Each channel has guardbands, i.e., areas of the spectrum near the channel, that are not used for signal delivery.

Typical testing of cables and in-house wiring uses a broadband power meter, and power is checked at each frequency throughout the expected frequency spectrum to be sent through the cables. However, since some frequencies are not used because of the guardbands, etc., the present invention checks each of the "channels" that are used by the system 100 to determine whether the cables can accept and pass the frequencies of interest.

Further, the present invention gives installers, whether professional installers or homeowners, a quick "go/no go" indication of whether the cables are acceptable for the system 100 demands.

System Diagram

Figure 3:
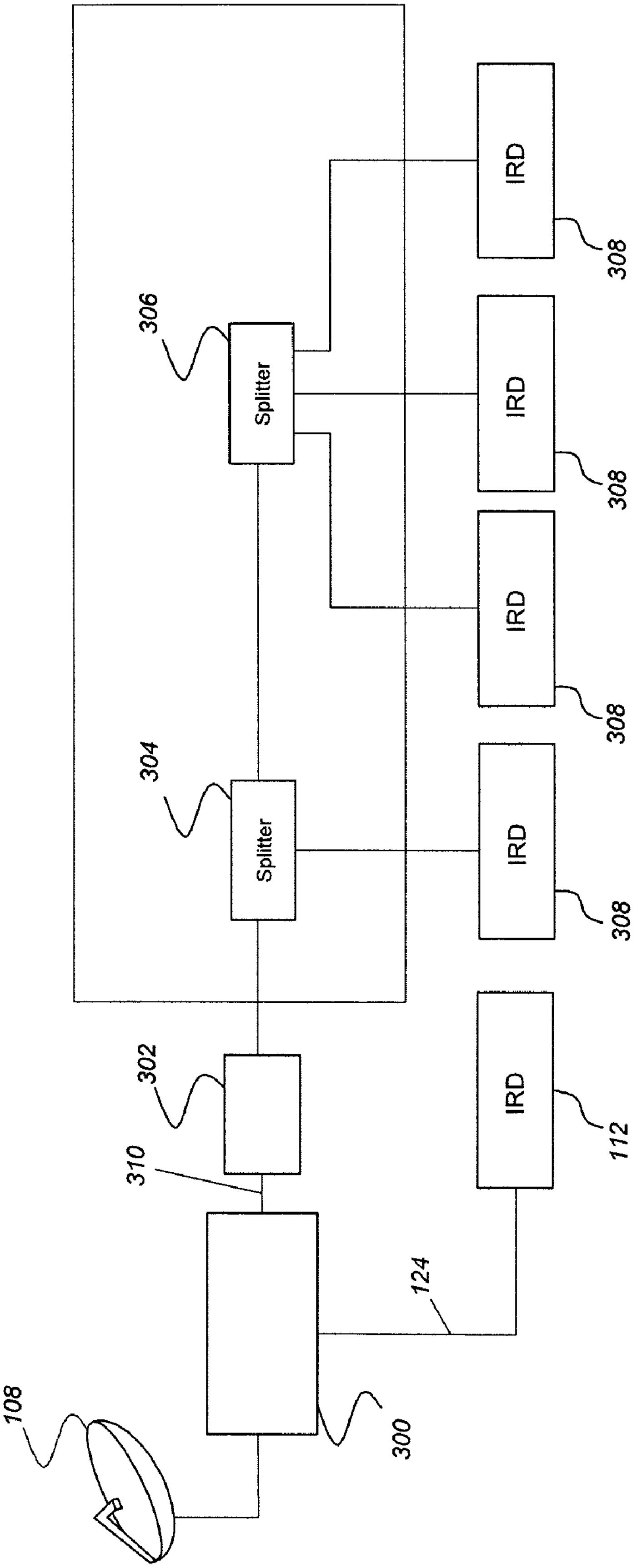
FIG. 3 illustrates a system diagram of the present invention.

FIG. 3 illustrates a system diagram of the present invention.

Figure 2:
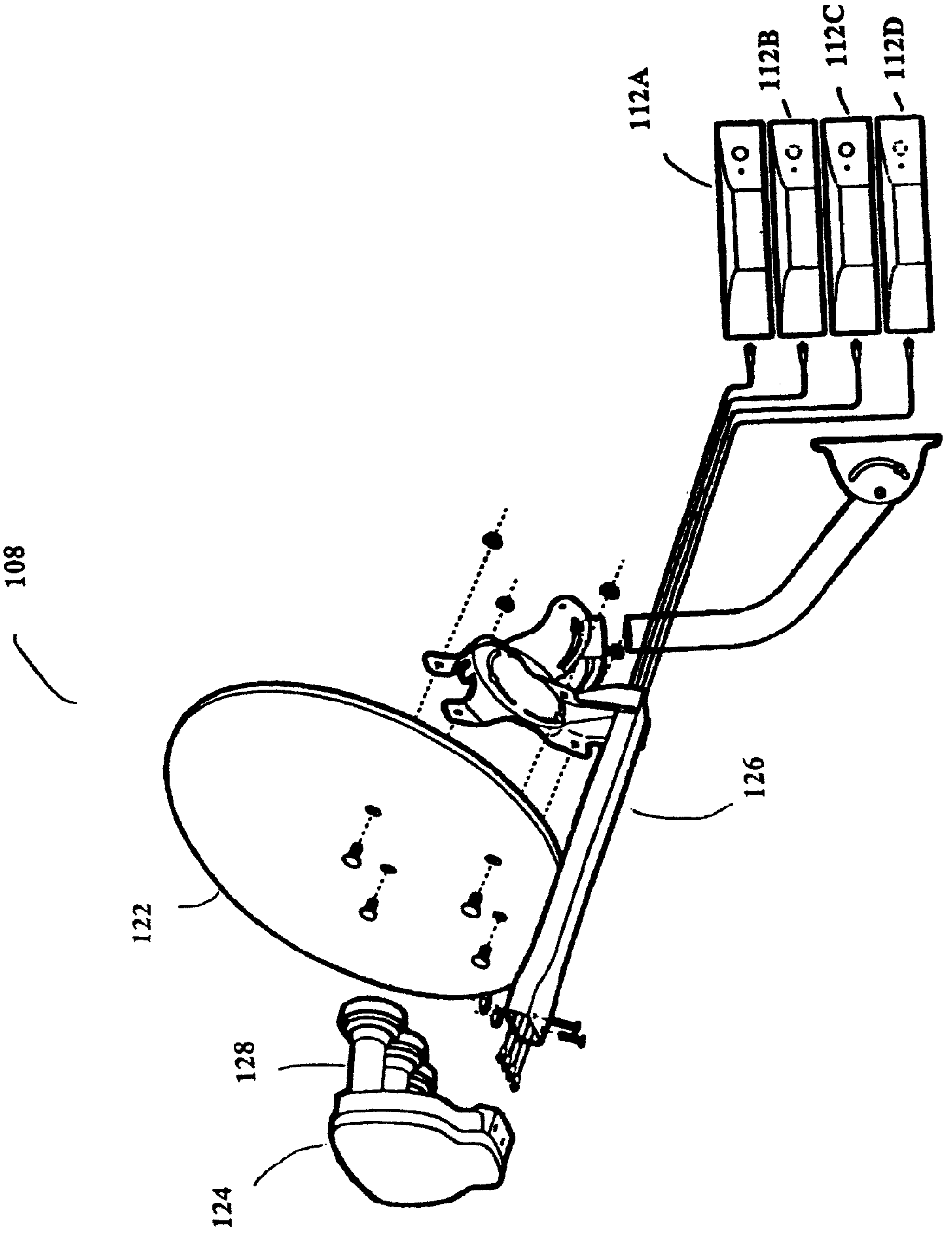
FIG. 2 illustrates a typical ODU of the related art.

In the present invention, ODU 108 is coupled to Frequency Translation Module (FTM) 300 (also known as a "Single Wire Multiswitch (SWM)"). FTM 300 is coupled to power injector 302. FTM 300 is able to directly support currently installed IRD 112 directly as shown via cable 124, as described with respect to FIGS. 1 and 2.

The present invention is also able to support new IRDs 308, via a network of signal splitters 304 and 306, and power injector 302. New IRDs 308 are able to perform two-way communication with FTM 300, which assists IRDs 308 in the delivery of custom signals on private IRD selected channels via a single cable 310. Each of the splitters 304 and 306 can, in some installations, have intelligence in allowing messages to be sent from each IRD 308 to FTM 300, and back from FTM 300 to IRDs 308, where the intelligent or smart signal splitters 304 and 306 control access to the FTM 300.

The two-way communication between IRDs 308 and FTM 300 can take place via cable 310, or via other wiring, such as power distribution lines or phone lines that are present within house 110.

It is envisioned that one or more possible communications schema can take place between IRD 308 and FTM 300 such that existing wiring in a house 110 can be used to deliver satellite signals and control signals between IRD 308 and FTM 300, such as an RF FSK approach or an RF ASK approach. Such schema include, but are not limited to, a digital FTM solution, a remultiplexed (remux) FTM solution, an analog FTM solution, and a hybrid FTM solution. These solutions, and other possible solutions, are discussed hereinbelow.

Frequency Translation Module

Figure 4:
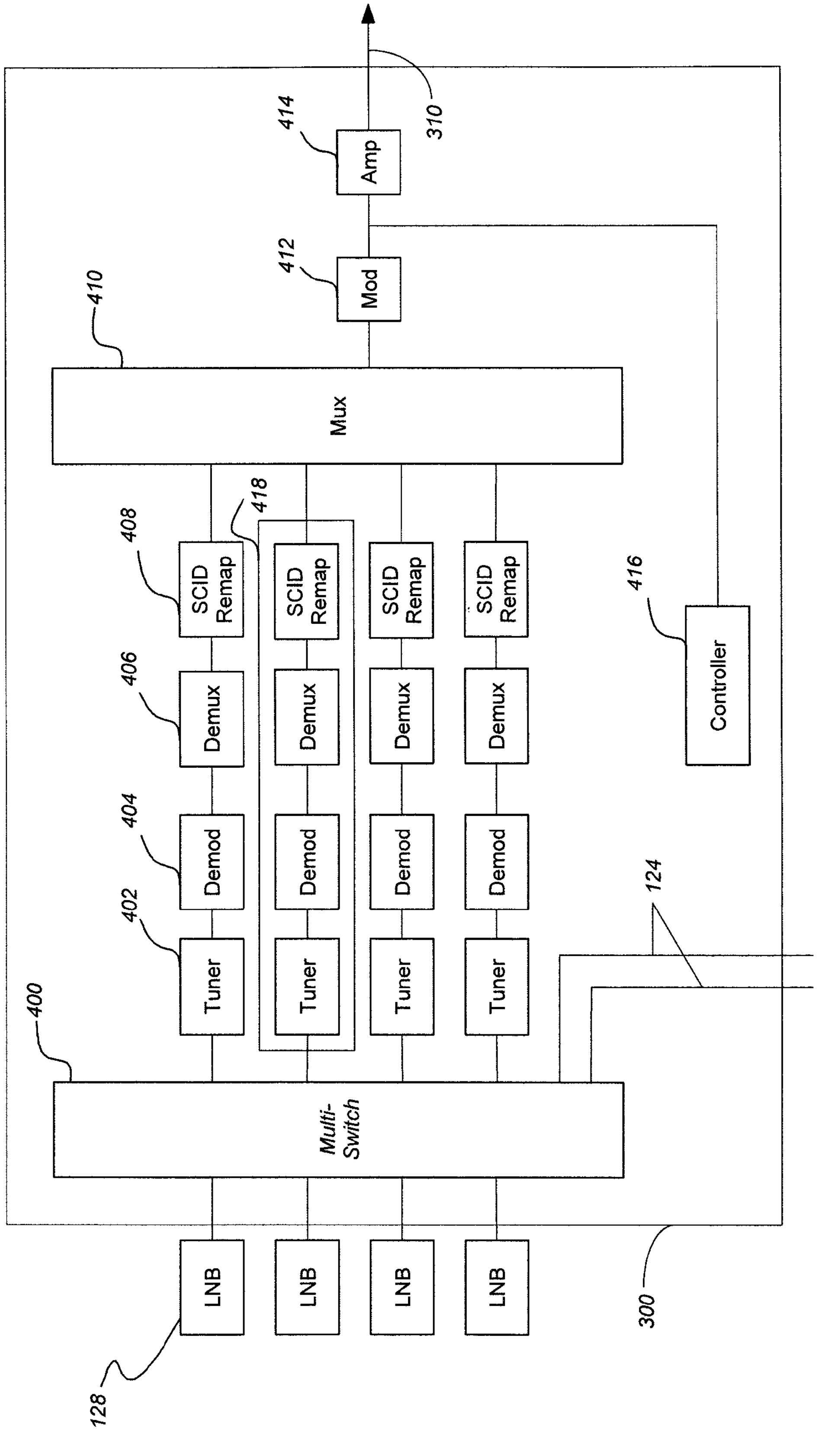
FIG. 4 is a detailed block diagram of a Single Wire Multiswitch used in conjunction with the meter of the present invention.

FIG. 4 is a detailed block diagram of the frequency translation module (single wire multiswitch) used with the present invention.

FTM 300 shows multiple LNBs 128 coupled to multiswitch 400. Multiswitch 400 supports current IRDs 112 via cable 124. Multiple cables 124 are shown to illustrate that more than one current IRD 112 can be supported. The number of current IRDs 112 that can be supported by FTM 300 can be more than two if desired without departing from the scope of the present invention.

Multiswitch 400 has several outputs coupled to individual tuners 402. Each tuner 402 can access any of the LNB 128 signals depending on the control signals sent to each tuner 402. The output of each tuner 402 is a selected transponder signal that is present in one of the downlink signals 120. The method of selection of the transponder will be discussed in more detail below.

After tuning to a specific transponder signal on each tuner 402, each signal is then demodulated by individual demodulators 404, and then demultiplexed by demultiplexers 406. Although this describes a Digital FTM 300 approach, an analog FTM approach will have similar output signals.

One approach is that the outputs of each of the demultiplexers 406 is a specific packet of information present on a given transponder for a given satellite 102-106. These packets may have similar nomenclature or identification numbers associated with them, and, as such, to prevent the IRDs 308 from misinterpreting which packet of information to view, each packet of information is given a new identification code. This process is called re-mapping, and is performed by the SCID remappers 408. The outputs of each of the SCID remappers 408 are uniquely named packets of information that have been stripped from various transponders on various satellites 102-106.

These remapped signals are then multiplexed together by mux 410, and remodulated via modulator 412. An amplifier 414 then amplifies this modulated signal and sends it out via cable 310.

The signal present on cable 310 is generated by requests from the individual IRDs 308 and controlled by controller 416. Controller 416 receives the requests from IRDs 308 and controls tuners 402 in such a fashion to deliver only the selected transponder data (in an Analog FTM schema) or individualized packets of interest within a given transponder to all of the IRDs 308 in a given house 110.

Other designs are possible for the SWM 300 used in conjunction with the present invention. For example, the SWM 308 can perform a frequency conversion or frequency translation of a selected transponder to a specific output frequency without the use of a tuner 402, demods 404, demuxes 406 or SCID remappers 408. Other embodiments of the SWM 300 are possible and useable with the present invention, as long as the frequencies of the SWM 300 are within a known range and detectable by the present invention.

In the related art, each of the cables 124 delivers sixteen (16) transponders, all at one polarization, from a satellite selected by IRD 112. Each IRD 112 is free to select any polarization and any satellite coupled to multiswitch 400. However, with the addition of new satellites and additional signals, the control of the multiswitch 400 by current IRDs 112, along with limitations on the tuner bandwidth available within the IRDs 112, provide difficult obstacles for distribution of signals within the current system 100. However, with tuners 402 located outside of individual IRDs 308, where the IRDs 308 can control the tuner 402 via controller 416, the system of the present invention can provide a smaller subset of the available downlink signal 120 bandwidth to the input of the IRD 308, making it easier for the IRD 308 to tune to a given viewer channel of interest. In essence, it adds additional stages of downlink signal 120 selection upstream of the IRD 308, which provides additional flexibility and dynamic customization of the signal that is actually delivered to individual IRDs 308.

Further, once the additional satellites are positioned to deliver Ka-band downlink signals 120, the FTM 300 can tune to these signals using tuners 402, and remodulate the specific transponder signals of interest within the Ka-band downlink signals 120 to individual IRDs 308 on cable 310. In this manner, the tuners present within each IRD 308 are not required to tune over a large frequency range, and even though a larger frequency range is being transmitted via downlink signals 120, the IRDs 308 can accept these signals via the frequency translation performed by FTM 300.

As shown in FIG. 4, chain 418, which comprises a tuner 402, demodulator 404, demultiplexer 406, and SCID remapper 408, is dedicated to a specific IRD 308. As a given IRD 308 sends requests back to FTM 300, each chain 418 is tuned to a different downlink signal 120, or to a different signal within a downlink signal 120, to provide the given IRD 308 the channel of interest for that IRD 308 on the private channel.

Although chain 418 is shown with tuner 402, demodulator 404, demultiplexer 406, and SCID remapper 408, other combinations of functions or circuits can be used within the chain 418 to produce similar results.

Meter Requirements

A Single-Wire Multiswitch (SWM) Meter in accordance with the present invention provides a simple means to measure the RF properties of a home cable configuration to determine if the previously installed wiring is suitable for SWM operations. Such a meter provides a Go/No Go indication about SWM service viability for each cable drop in the home.

Such a meter can be of an analog or digital design, is simple to use, and typically battery operated. The meter can optionally include a Frequency Shift Keyed (FSK) meter to validate the FSK communications channel of the SWM (FTM).

Related art meters do not have the capability to determine that individual channels of the FTM/SWM have been successfully transmitted to IRD 308 and/or IRD 112. Such meters suffer from sensitivity issues, and typically measure power over the entire frequency spectrum that is being transmitted by FTM 300 on cable 310, rather than the individual channel outputs (determined by tuners 402) on cable 310.

Further, the present invention also allows for verification of the FSK communications channel of the FTM/SWM 300. Upon power up of the FTM/SWM 300, the FTM/SWM 300 periodically transmits an FSK signal to alert IRD 308 that FTM/SWM 300 is ready to receive registration commands. Such an FSK signal can be detected either by a digital receiver or by an analog-only channeled receiver. The present invention allows for testing of this communication signal from the FTM/SWM 300 to the FSK portion of the meter of the present invention.

FIGS. 5-10 illustrate various embodiments of meters in accordance with the present invention.

Figure 5:
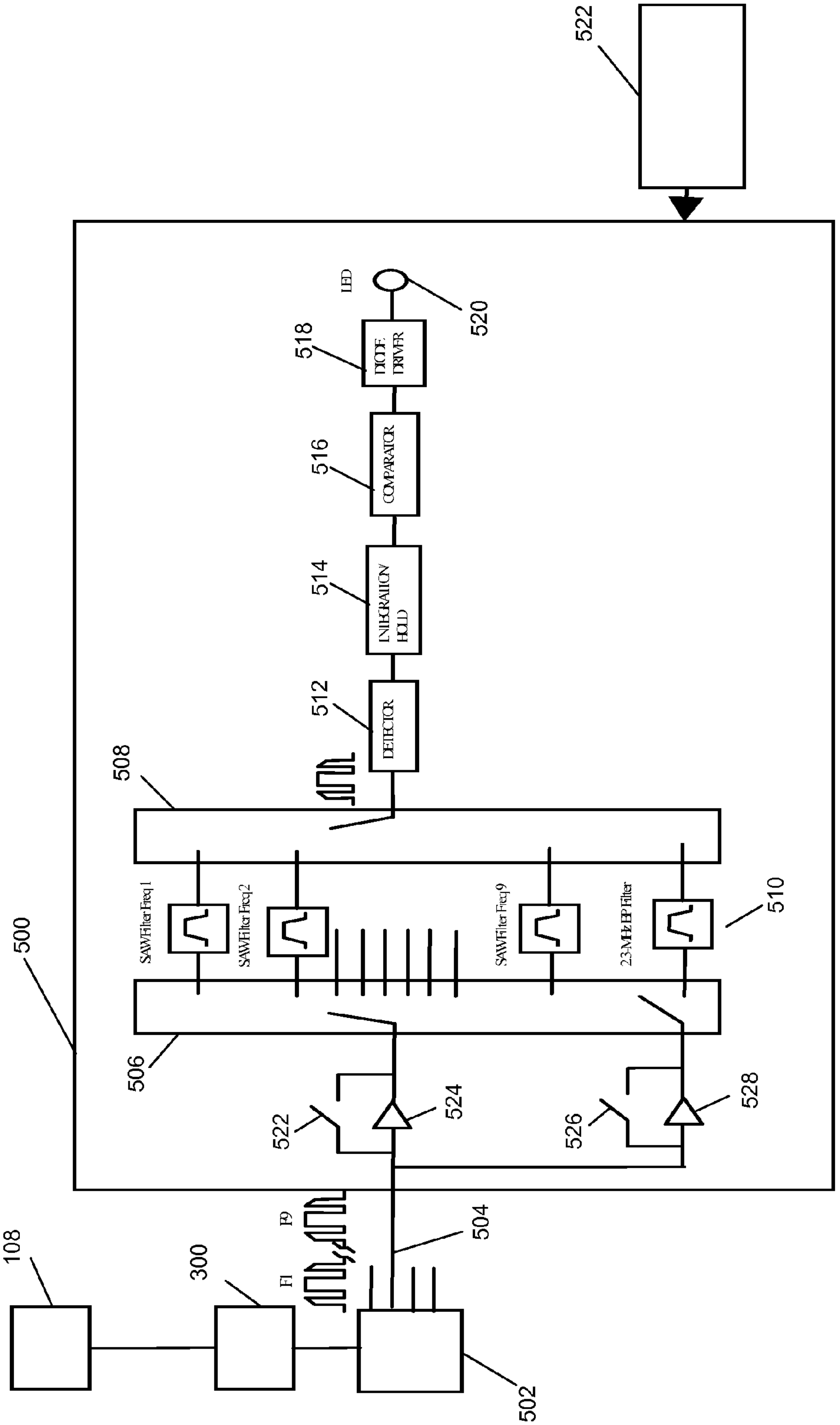
FIGS. 5-11 illustrate various embodiments of meters in accordance with the present invention.

FIG. 5 illustrates SWM meter 500, coupled to splitter 502 via cabling 504, which is coupled to FTM/SWM 300 and ODU 108. Typically, cabling 504 is wiring that is pre-installed in a home 110, however, cabling 504 can be installed, troubleshot, or repaired as a result of the use of meter 500.

Meter 500 uses switches 506 and 508 to selectively switch the output of cable 504 through filters 510. Each of the filters 510 filters out the various frequency portions of the signal from FTM/SWM 300, e.g., each of the filters 510 can be centered on one of the tuner 402 frequencies, or can cover one of the several different frequencies that is being output from LNBs 128 through multiswitch 400. As such, each of the frequency ranges that is being output from SWM 300 is tested independently, rather than as an aggregate or overall power measurement, to each of the cables 504 that is run through house 110. Filters 510 are typically SAW filters that select each frequency independently to allow for fast frequency roll off and adequate frequency rejection within meter 500.

Switch 508 then sends a signal to a detector 512, which is typically a diode detector, to detect the presence of the signal in the specific frequency range, and then forwarded to an integrator 514 to hold the specific voltage level (power level) of the specific frequency range.

The output of integrator 514 is then compared with a preset power (voltage) value in comparator 516. Comparator 516 can have a selectable preset power value if desired without departing from the scope of the present invention. For example, and not by way of limitation, meter 500 can be loaded with values that are "standard" for most installations, however, many installations, depending on which IRD 112/308 is used, etc., etc. may require different power levels to operate correctly, and meter 500 can be loaded with these values to perform such special installations of ODU 108, SWM 300, and cabling 504. One of the filters 510 is a 2.3 MHz filter to allow for testing of the FSK command/registration portion of SWM 300 via meter 500.

The signal from comparator 516 is fed to a driver 518, which provides an input to display 520. Typically, display 520 is an LED that either turns green to indicate that the comparator 516 output a favorable reading, e.g., the power (voltage) level of the signal from SWM 300 was of a high enough value to drive IRD 112/308, or display (when an LED) turns red to indicate that the comparator 516 output an unfavorable reading, e.g., the power (voltage) level of the signal from SWM 300 was not of a high enough value to drive IRD 112/308. Other colors can indicate other conditions, e.g., a yellow color from the display 520 could indicate marginal conditions, etc. Further, the LED may be a single color LED, which turns on when the reading is favorable and is off when the reading is not acceptable, or turns off when the reading is favorable and is on when the reading is not acceptable.

Power is supplied to meter 500 via power source 522. Power source 522 can be a battery, either a rechargeable or replaceable battery or an AC power brick. In alternative uses of meter 500, the power can come from the IRD 112/308, depending on the testing procedure.

Such a meter would typically be operated as follows: point ODU 108 antenna and connect all outputs to SWM 300 inputs. Turn on SWM 300, connect output cables 310 and 504, but do not attach IRDs 112/308.

Connect the SWM meter 500 to one output of the power splitter and verify all frequencies are present and the power levels are acceptable. At each cable drop in the home, plug in meter 500. Press switch 522 to test first SWM output frequency, and check indicator 520 for status. If do not see a signal, switch in amplifier 524 and press switch again. Check indicator 520 status. Repeat these steps for all SWM 300 output frequencies via switches 506 and 508. Alternatively, the meter may automatically switch in the amplifiers.

If all signals are satisfactory, use switch 526 to test FSK signal, and check indicator 520 for status. If a signal is not present, switch in optional amplifier 528 and press switch 526 again. Check indicator 520 status.

Figure 6:
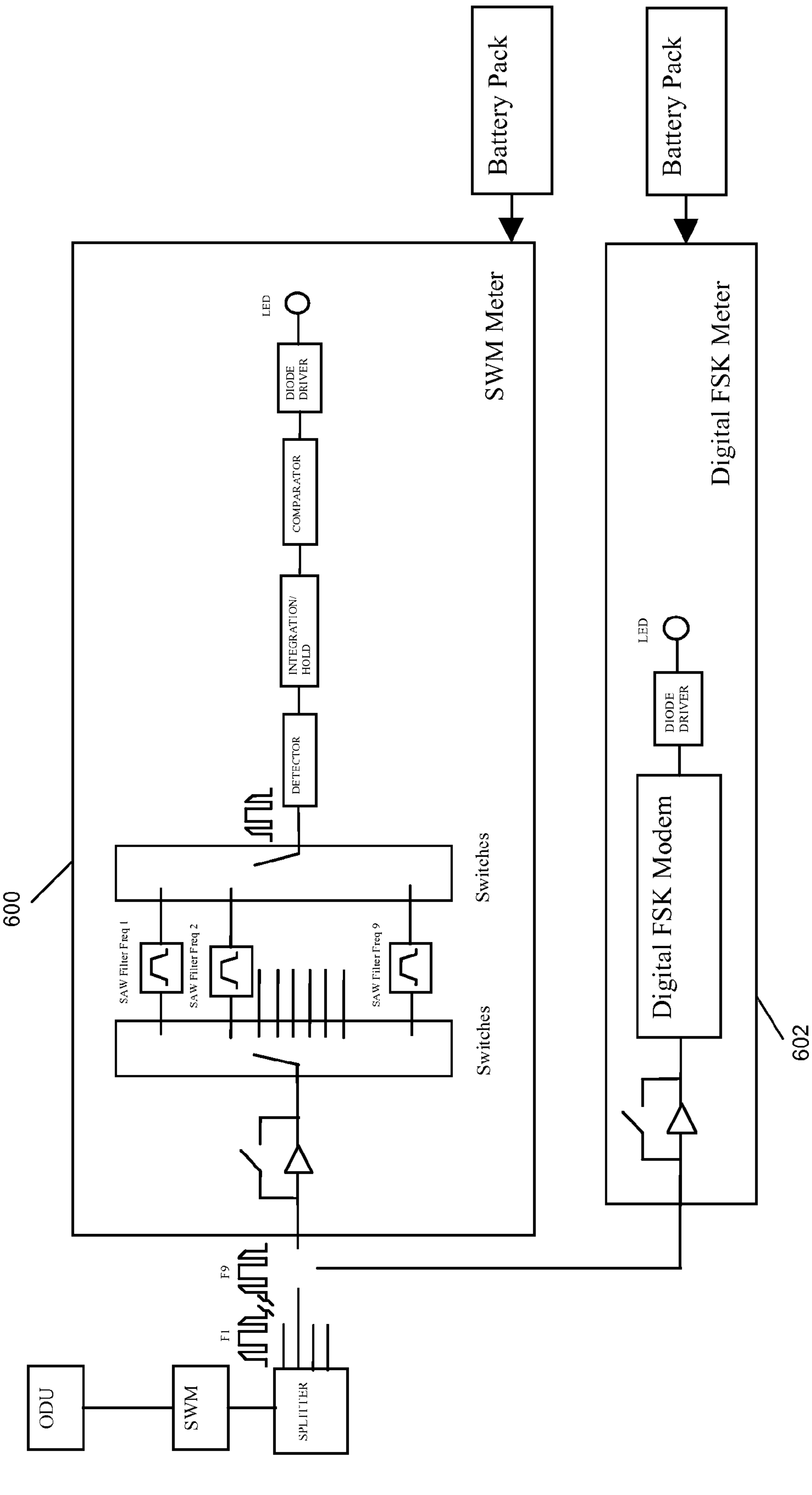

FIG. 6 illustrates the separation of meter 500 into two separate meters 600 and 602, where meter 600 checks the frequency outputs of SWM 300 and meter 602 performs the FSK verification. Alternatively, a simple power sensing circuit may be used in place of the digital FSK modem. Operation of meters 600 and 602 are similar to that of meter 500.

Figure 7:
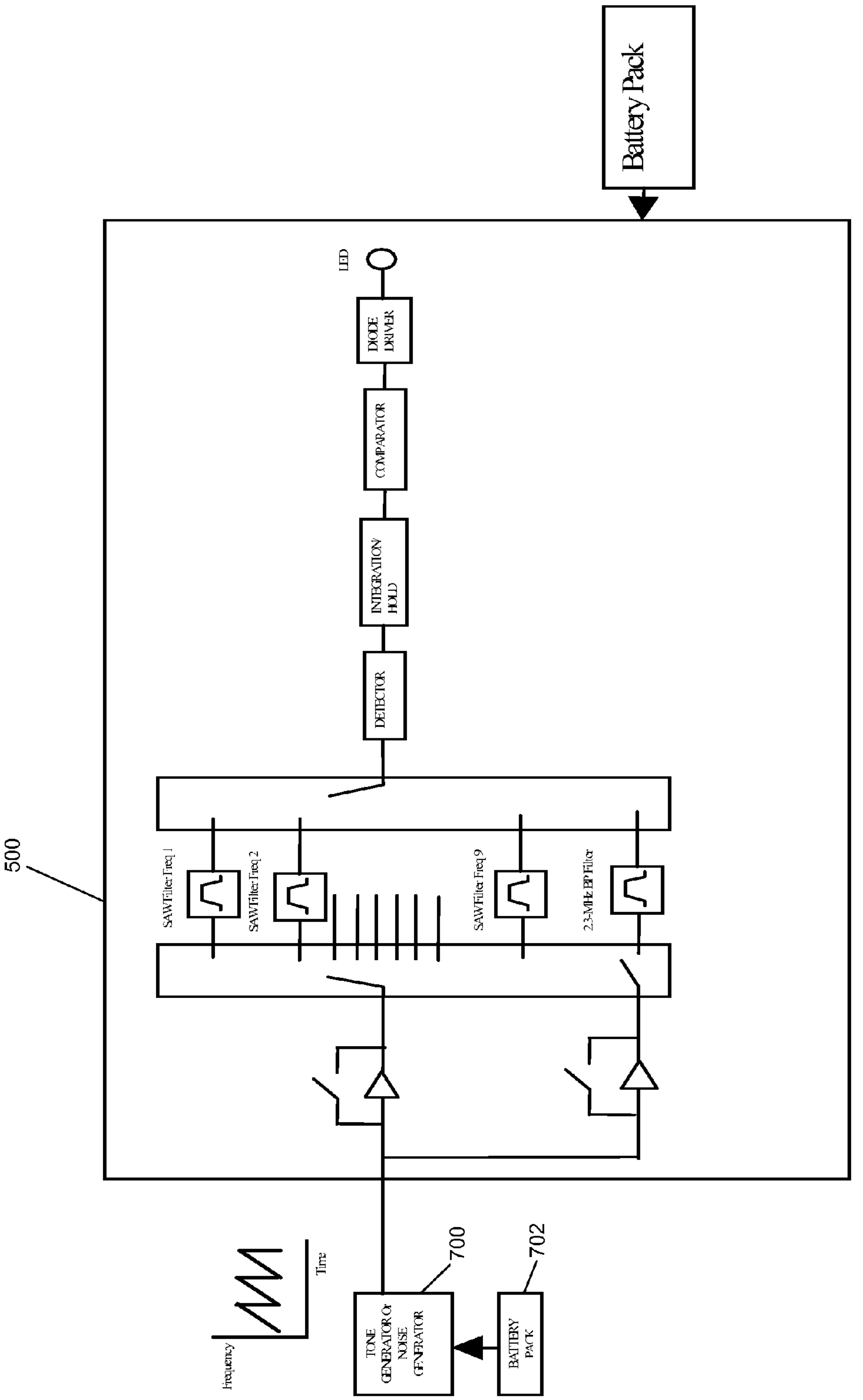

FIG. 7 illustrates the use of meter 500 with a tone or noise generator 700, with a power source 702, that generates signals similar to that of the ODU 108/SWM 300. Such an arrangement can be used to determine whether existing wiring in a house 110 can accept and forward signals from an SWM 300 prior to an SWM 300 installation. The tone or noise generator 700 may be placed near the SWM 300 to test signal distribution from SWM 300 to cable drops, or at one cable drop to test its FSK communication with the SWM or other cable drops. Further, the output of tone generator 700 can be inserted into one end of a cable, and meter 500 can be used at another end of a cable in a home, to determine whether or not the cable can properly support the use of a SWM 300 and/or support a system 100 in a given home 110. This will allow installers to determine whether pre-existing wiring in a home can be used during installation, or if new wiring must be installed to support a given installation of a SWM 300 or the home 110 portion of system 100.

Figure 8:
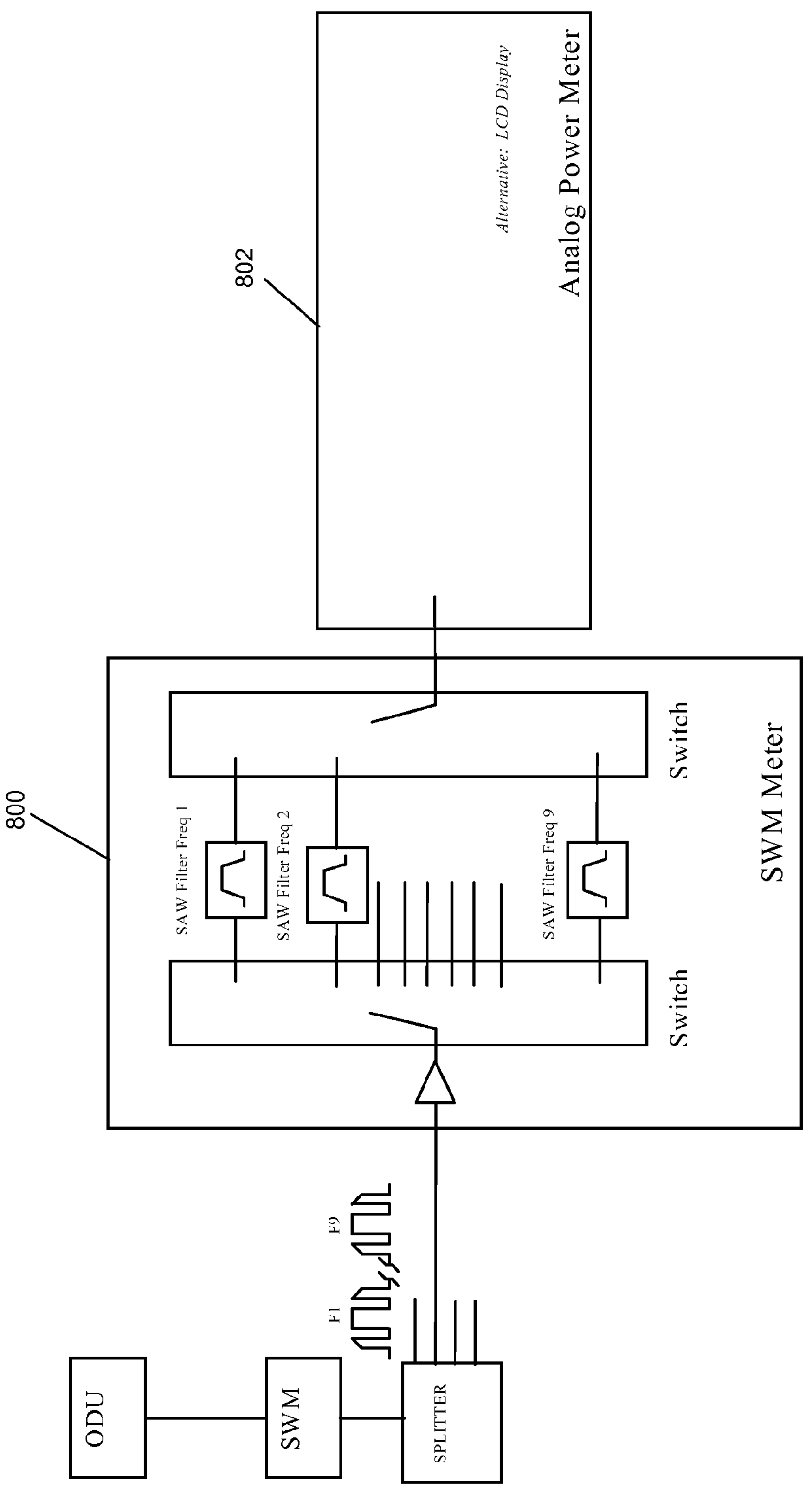

FIG. 8 illustrates splitting the meter up into the switching portion and the signal measurement portion of the meter. Switching portion 800 performs similar functions to meter 500, but rather than an indicator, a signal meter 802, which can be analog or digital, or have an LCD or LED display showing relative signal strength for each of the measured filtered portions of the signal from SWM 300, can be measured and recorded rather than merely given a go/no go label. Such information can assist the installer in determining what remedies, if any, can be attempted with regards to wiring 504, ODU 108 alignment, or SWM 300 repair or replacement. FIG. 8 may also include the FSK portion.

Figure 9:
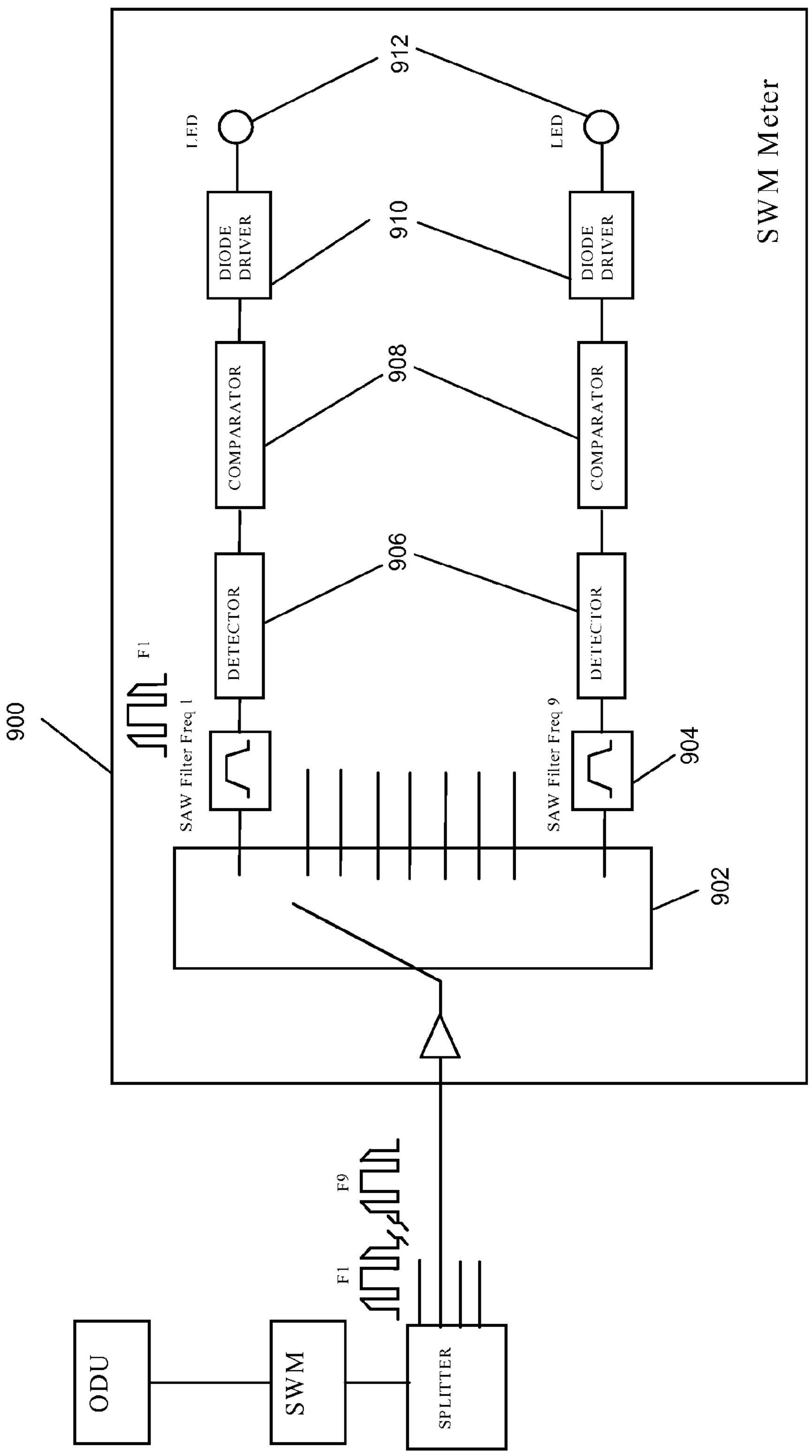

FIG. 9 illustrates meter 900. Meter 900 uses switch 902 to selectively switch the output of cable 504 through filters 904. Each of the filters 904 filters out the various frequency portions of the signal from FTM/SWM 300, e.g., each of the filters 904 can be centered on one of the tuner 402 frequencies, or can cover one of the several different frequencies that is being output from LNBs 128 through multiswitch 400. As such, each of the frequency ranges that is being output from SWM 300 is tested independently, rather than as an aggregate or overall power measurement, to each of the cables 504 that is run through house 110. Filters 904 are typically SAW filters that select each frequency independently to allow for fast frequency roll off and adequate frequency rejection within meter 900.

Rather than using a second switch 508 as in meter 500, meter 900 then sends each of the filtered signals to a separate detector 906, which is typically a diode detector, to detect the presence of the signal in the specific frequency range. The output of each integrator 908 is then compared with a preset power (voltage) value in comparator 908. Each comparator 908 can have a selectable preset power value if desired without departing from the scope of the present invention. For example, and not by way of limitation, meter 900 can be loaded with values that are "standard" for most installations, however, many installations, depending on IRD 112/308 requirements, etc. may require higher power levels to operate correctly and meter 900 can be loaded with these values to perform such special installations of ODU 108, SWM 300, and cabling 504. One of the filters 510 can also be a 2.3 MHz filter to allow for testing of the FSK command/registration portion of SWM 300 as described with respect to FIG. 5 and meter 500.

The signal from comparator 908 is fed to a driver 910, which provides an input to displays 912. Typically, displays 912 are LEDs that either turns green to indicate that the comparators 908 output a favorable reading, e.g., the power (voltage) level of the signal from SWM 300 was of a high enough value to drive IRD 112/308, or display (when an LED) turns red to indicate that the comparators 912 output an unfavorable reading, e.g., the power (voltage) level of the signal from SWM 300 was not of a high enough value to drive IRD 112/308. Such an approach, shown by meter 900, allows a technician or installer to see instantaneously which of the several frequency ranges are good or bad, although meter 900 will typically have more parts than meter 500.

Figure 10:
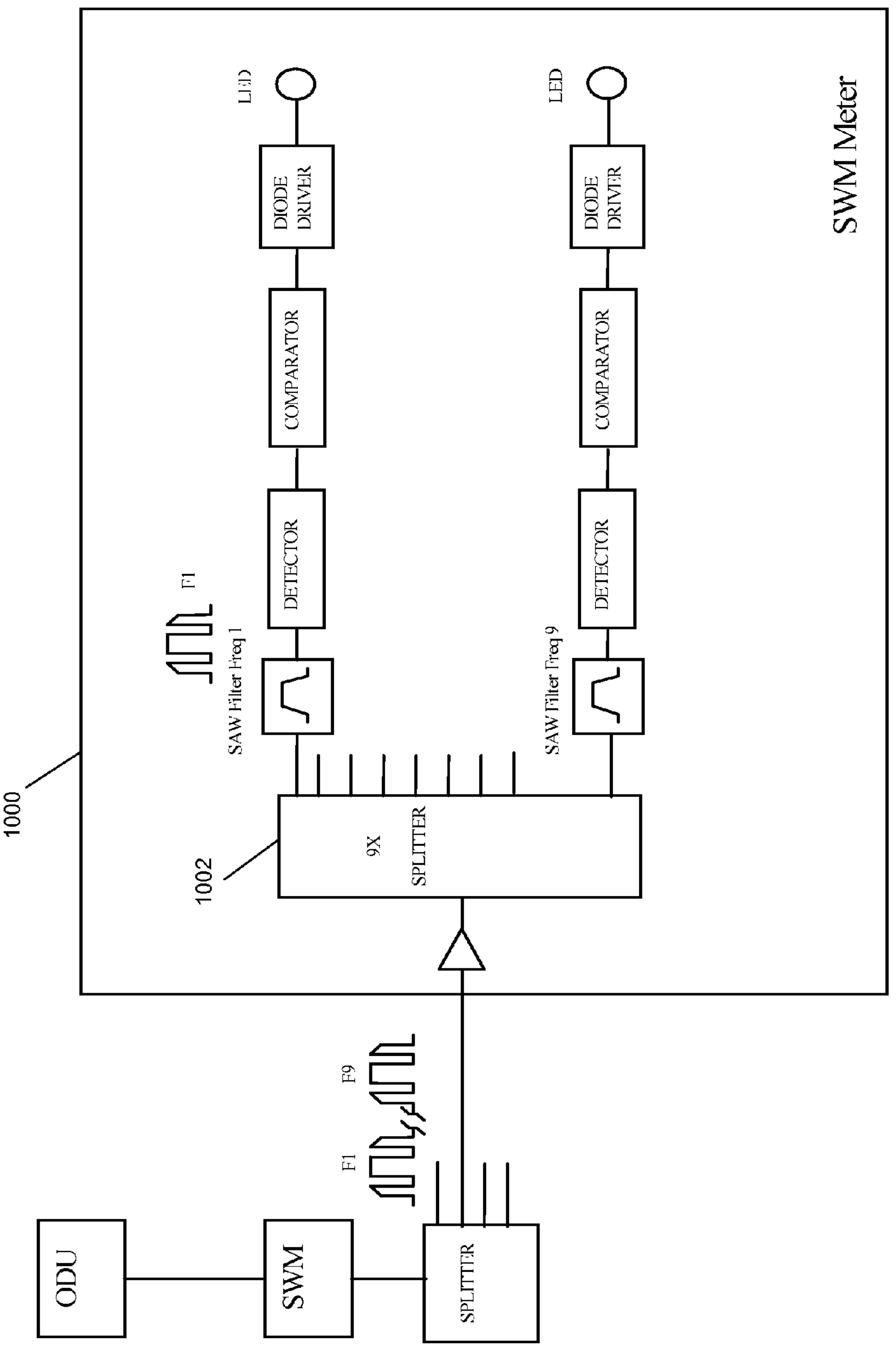

FIG. 10 illustrates meter 1000. Meter 1000 replaces switch 506 with a splitter 1002, such that each of the comparators, detectors, etc. can be used simultaneously. Meter 1000 can also include the FSK portion as described with respect to FIG. 5. Now, each of the frequency ranges of the meter 1000 will be displayed substantially simultaneously, and the operator or technician can see at one glance which, if any, of the frequency spectra are or are not being passed through cabling 504.

Figure 11:
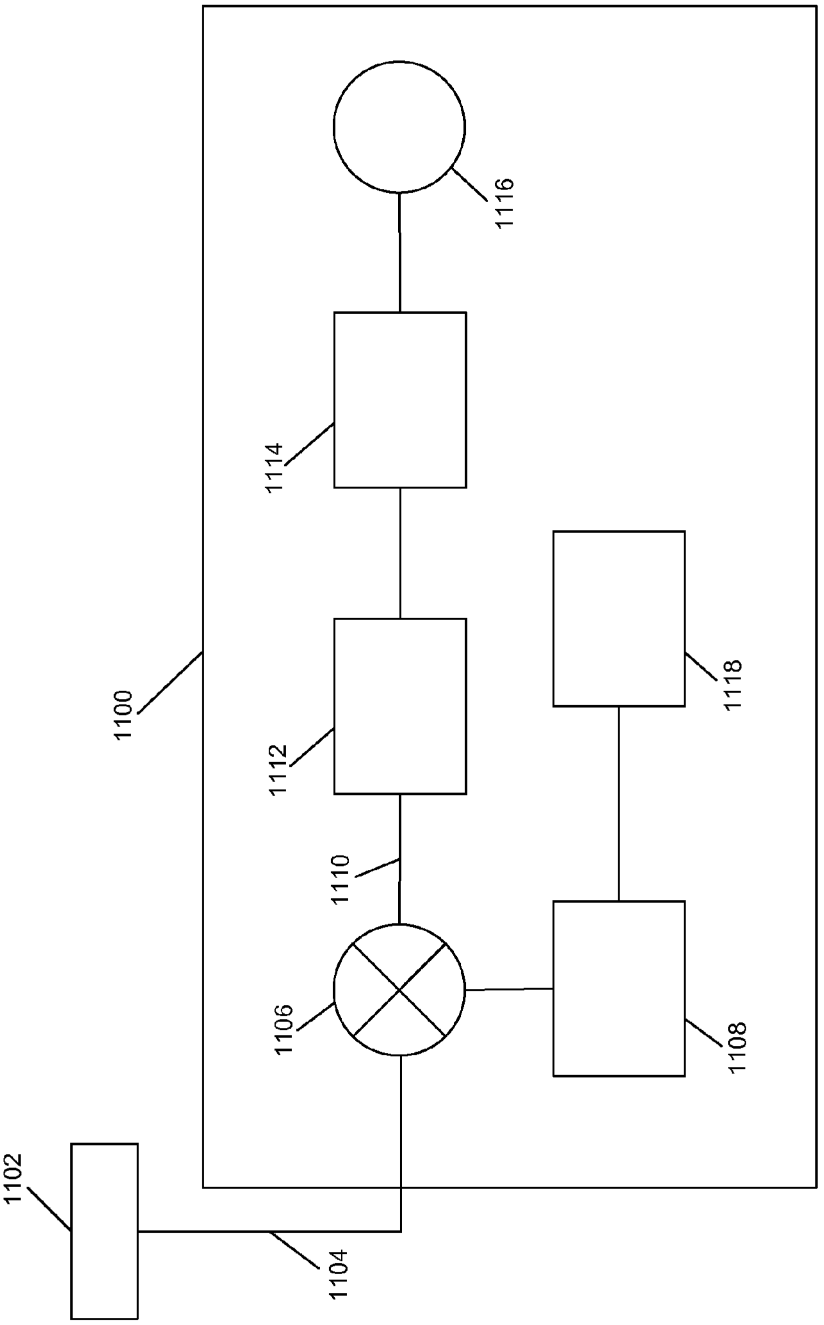

FIG. 11 illustrates a frequency agile analog power detector in accordance with the present invention.

Meter 1100 accepts an input signal 1102, typically input 504, but input signal 1102 can also be a test signal of a known frequency spectrum and power, through wiring 1104. Input 1102 can come directly from the SWM 300 if desired.

Input 1102 is fed into mixer 1106, or, optionally, is fed into an optional amplifier with an AGC circuit to provide the proper operating point for mixer 1106, which mixes local oscillator (LO) 1108 signal with input 1102 to downconvert input signal 1102 to an intermediate frequency (IF) 1110. The IF 1110 is then passed through bandpass filter 1112, which can be an analog bandpass filter such as a SAW filter similar to those described with respect to FIGS. 5-10. Once the IF is filtered by filter 1112, the power in the filtered signal is detected by detector 1114, and, depending on the power found in the filtered signal, indicator 1116 displays a condition associated with the filtered signal. Typically indicator 1116 is an LED, which turns red if the power in the filtered signal is not above a threshold, or turns green if the power in the filtered signal is above a certain threshold, but other indication schemes can be used without departing from the scope of the present invention.

Local Oscillator 1106 can be controlled by a controller 1118, to allow for different mixing capabilities and different IF frequencies for input signal 1102. For example, by changing the LO 1108 frequency, different portions of input signal 1102 are passed through the bandpass filter 1112, and, thus, the power in those different portions of input signal 1102 are verified as being distributed by wiring 1104. This allows for an installer to determine, without complicated instruments or specialized knowledge, whether wiring 1104 will be able to distribute an expected input signal 1102, or whether wiring 1104 has a problem with a given set of frequencies.

Depending on the frequencies selected by controller 1118, the wiring 1104 can be tested for the specific frequencies that are expected for system 100, and those frequencies that are not used in system 100 can be excluded from the test performed by the meters in FIGS. 5-11, since those frequencies are unused by system 100. Controller 1118 can be a microprocessor or other automatic controller, but can also be a manual switch network or other selectable network, such that the costs and ease of use of meter 1100 can be adapted to installers and system 100 operators.

Application to Cable Television

The present invention can also be used to verify cabling 504 for cable television systems. For example, Generator 700 can be replaced by the actual signal that will be used to feed into receiver 112 and shown on monitor 114, or can be a sweep generator, sawtooth generator, or other tone or noise generator that provides an output which can be filtered by filters 510. Further, switch 506 can optionally be coupled to a separate filter 510 which verifies the communications channel from receiver 112 back to communication station 118.

After the filters 510, a second switch 508 is used to selectively switch the filtered signal, which represents a portion of the frequency spectrum generated by generator 700, to detector 512. This signal is then integrated and stored by integrator 514, and compared against a predetermined threshold level in comparator 516. A driver 518 is then used to drive an indicator 520 to show the condition of that portion of the spectrum. Power source 522 is used to power up meter 500.

Each of the filters 510 can filter out one or more "channels" of the frequency spectrum that are used by system 100. So, for example, in a terrestrial cable system, each of the filters 510 can filter out a 6 MHz wide portion of the spectrum, where that portion is centered on one of the frequencies used to transmit signals in such a system 100. The filters can then be sequentially checked by switching switches 506 and 508, and each "channel" in system 100 can be passed through wiring 504 and can be verified by meter 500 as having the proper characteristics based on the status of indicator 520.

For a given "channel" in system 100, switches 506 and 508 are placed in a certain position, and indicator 520 gives a status of characteristics in that channel. So, for example, the power in that filtered signal can be measured by detector 512, and compared to a required (predetermined) power level that is needed by receiver 112 in comparator 516. If the power level of the filtered signal is above the needed threshold, indicator 520 will indicate as such; if the power level is below the threshold, indicator 520 can indicate as such. Such indications can include the indicator 520 turning different colors or emitting different sounds to indicate the status of that portion of the frequency spectrum that is being tested by meter 500. Further, meter 500 can indicate a "low" or "near threshold" condition by using a different indicia (e.g., different color, different sound, etc. than the go/no go condition indicia).

As such, each of the frequency ranges that is being output from generator 700 is tested independently, rather than as an aggregate or overall power measurement, to each of the cables 504 that is run through house 110.

By connecting meter 500 to each cable output (also known as a cable "drop") in house 110, connecting generator 700 (or other signal source) to the input to house 110, and stepping through the frequencies needed by switching switches 506 and 508, the meter 500 can verify all of the cabling 504 in house 110 can withstand and deliver the frequencies needed at the power levels required for each receiver 112 that could be placed in house 110. Similar operational characteristics are available for the meters described in FIGS. 6-11 to use these meters in a cable television system.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, and not by way of limitation, amplifiers can be moved around within the meter embodiments from before the switch networks to after the switch networks, the other components may take the form of ASIC or LSI circuitry, and the displays may be LEDs, LCDs, or some other type of display. The figures and descriptions shown herein are for illustration purposes only, and are not to be construed to limit the present invention.

In summary, the present invention describes systems, methods, and apparatuses for testing the delivery of satellite signals.

A system in accordance with the present invention comprises a meter, coupled to a receive antenna through a Single-Wire Multiswitch (SWM), wherein the receive antenna receives satellite signals and downconverts the satellite signals to an intermediate frequency spectrum; and the SWM selects the requested frequencies for the IRDs the meter comprising: a plurality of filters, at least one detector, coupled to the plurality of filters, for detecting a portion of the intermediate frequency spectrum, the portion of the intermediate frequency spectrum being defined by the plurality of filters, a comparator, for comparing the detected portion of the intermediate frequency against a predetermined condition, and at least one indicator, coupled to the at least one detector, for indicating an actual condition of the portion of the intermediate frequency spectrum.

Such a system further optionally comprises the actual condition of the portion of the intermediate frequency spectrum comprising a power level of the portion of the intermediate frequency spectrum, a switch network, coupled to the plurality of filters, such that the intermediate frequency spectrum being filtered through the plurality of filters in a sequential manner, the at least one indicator being a light emitting diode, the light emitting diode emitting light in a first color when the comparator determines that the predetermined condition is met by the actual condition of the portion of the intermediate frequency spectrum, actual conditions of a plurality of portions of the intermediate frequency spectrum being indicated simultaneously, a Frequency Shift Keyed (FSK) detector, coupled to the plurality of filters, for detecting a condition of an FSK communications channel, a tone generator, coupled to an input of the plurality of filters, the at least one indicator being a power meter, and the predetermined condition being stored in the meter.

Another system in accordance with the present invention comprises a meter, coupled to a cable for delivering signals, comprising: a mixer for receiving the satellite signals, a frequency source, coupled to the mixer, for converting the signals to an intermediate frequency spectrum, a filter, coupled to an output of the mixer;

at least one detector, coupled to the filter, for detecting a portion of the intermediate frequency spectrum, the portion of the intermediate frequency spectrum being defined by the filter, at least one indicator, coupled to the at least one detector, for indicating an actual condition of the portion of the intermediate frequency spectrum, and a controller, coupled to the frequency source, for changing the frequency source wherein changing the frequency source changes the intermediate frequency spectrum such that different portions of the intermediate frequency spectrum are detected by the detector.

Such a system further optionally comprises the actual condition of the portion of the intermediate frequency spectrum comprises a power level of the portion of the intermediate frequency spectrum, the at least one indicator being a light emitting diode, the light emitting diode emitting light in a first color when the comparator determines that the predetermined condition is met by the actual condition of the portion of the intermediate frequency spectrum, actual conditions of a plurality of portions of the intermediate frequency spectrum being indicated simultaneously, a Frequency Shift Keyed (FSK) detector, coupled to the plurality of filters, for detecting a condition of an FSK communications channel, and the at least one indicator being a power meter.

It is intended that the scope of the invention be limited not by this detailed description, but rather by the claims appended hereto and the equivalents thereof. The above specification, examples and data provide a complete description of the manufacture and use of the composition of the invention. Since many embodiments of the invention can be made without departing from the spirit and scope of the invention, the invention resides in the claims hereinafter appended and the equivalents thereof.

What is claimed is:

1. A system for testing the delivery of satellite signals, comprising:

a meter, coupled to a receive antenna through a Single-Wire Multiswitch (SWM), wherein the receive antenna receives satellite signals and downconverts the satellite signals to an intermediate frequency spectrum; and the SWM selects the requested frequencies for the IRDs the meter comprising:

a plurality of filters;

at least one detector, coupled to the plurality of filters, for detecting a portion of the intermediate frequency spectrum, the portion of the intermediate frequency spectrum being defined by the plurality of filters;

a comparator, for comparing the detected portion of the intermediate frequency against a predetermined condition; and at least one indicator, coupled to the at least one detector, for indicating an actual condition of the portion of the intermediate frequency spectrum.

2. The system of claim 1, wherein the actual condition of the portion of the intermediate frequency spectrum comprises a power level of the portion of the intermediate frequency spectrum.

3. The system of claim 2, wherein the meter further comprises a switch network, coupled to the plurality of filters, such that the intermediate frequency spectrum is filtered through the plurality of filters in a sequential manner.

4. The system of claim 3, wherein the at least one indicator is a light emitting diode.

5. The system of claim 4, wherein the light emitting diode emits light in a first color when the comparator determines that the predetermined condition is met by the actual condition of the portion of the intermediate frequency spectrum.

6. The system of claim 1, wherein actual conditions of a plurality of portions of the intermediate frequency spectrum are indicated simultaneously.

7. The system of claim 1, further comprising a Frequency Shift Keyed (FSK) detector, coupled to the plurality of filters, for detecting a condition of an FSK communications channel.

8. The system of claim 1, further comprising a tone generator, coupled to an input of the plurality of filters.

9. The system of claim 1, wherein the at least one indicator is a power meter.

10. The system of claim 1, wherein the predetermined condition is stored in the meter.

11. A system for testing the delivery of signals, comprising:

a meter, coupled to a cable for delivering signals, comprising:

a mixer for receiving the satellite signals;

a frequency source, coupled to the mixer, for converting the signals to an intermediate frequency spectrum;

a filter, coupled to an output of the mixer;

at least one detector, coupled to the filter, for detecting a portion of the intermediate frequency spectrum, the portion of the intermediate frequency spectrum being defined by the filter;

at least one indicator, coupled to the at least one detector, for indicating an actual condition of the portion of the intermediate frequency spectrum; and a controller, coupled to the frequency source, for changing the frequency source wherein changing the frequency source changes the intermediate frequency spectrum such that different portions of the intermediate frequency spectrum are detected by the detector.

12. The system of claim 11, wherein the actual condition of the portion of the intermediate frequency spectrum comprises a power level of the portion of the intermediate frequency spectrum.

13. The system of claim 12, wherein the at least one indicator is a light emitting diode.

14. The system of claim 13, wherein the light emitting diode emits light in a first color when the comparator determines that the predetermined condition is met by the actual condition of the portion of the intermediate frequency spectrum.

15. The system of claim 11, wherein actual conditions of a plurality of portions of the intermediate frequency spectrum are indicated simultaneously.

16. The system of claim 11, further comprising a Frequency Shift Keyed (FSK) detector, coupled to the plurality of filters, for detecting a condition of an FSK communications channel.

17. The system of claim 11, wherein the at least one indicator is a power meter.

* * * * *